UNITED STATES PATENT OFFICE.

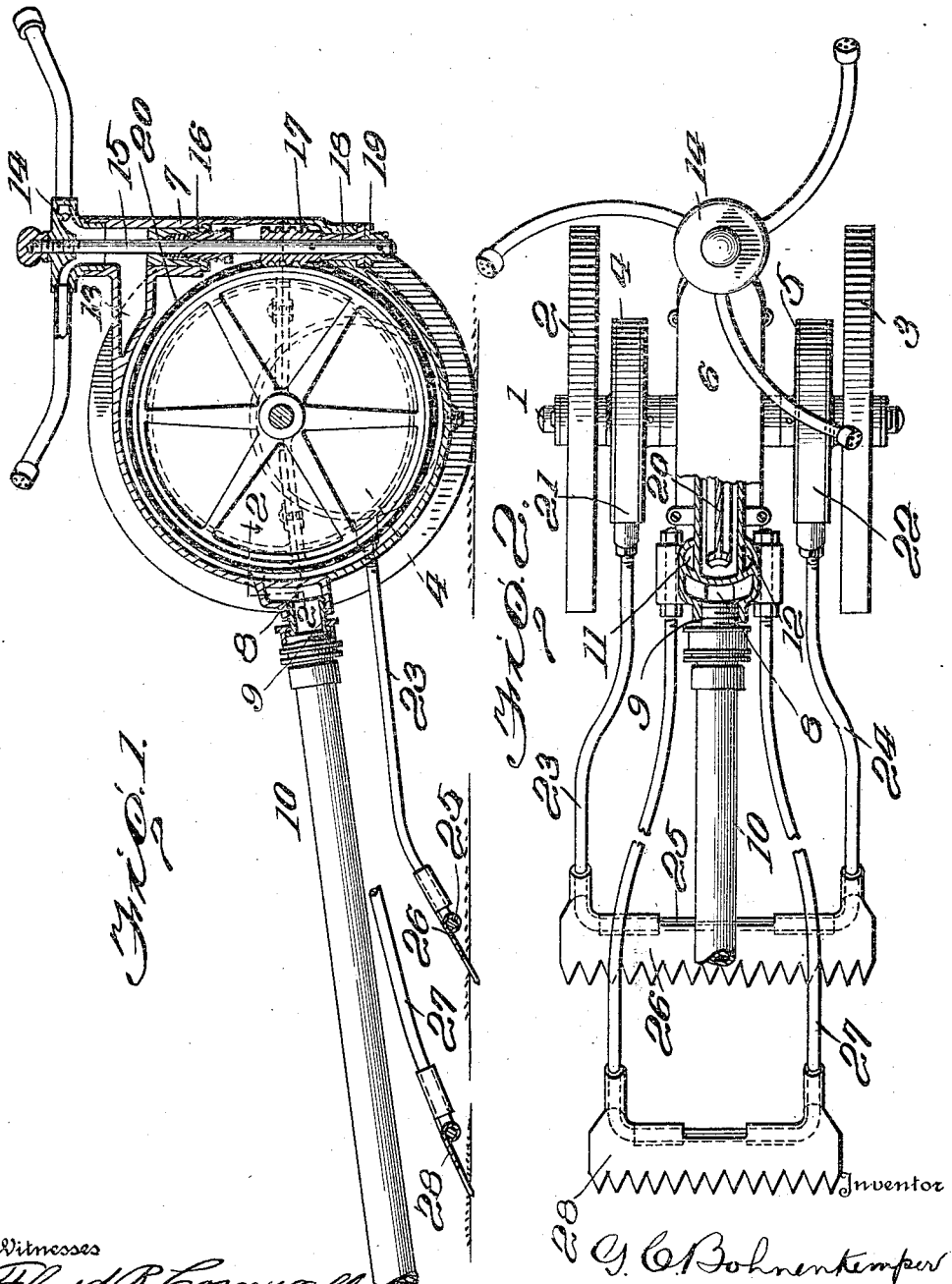

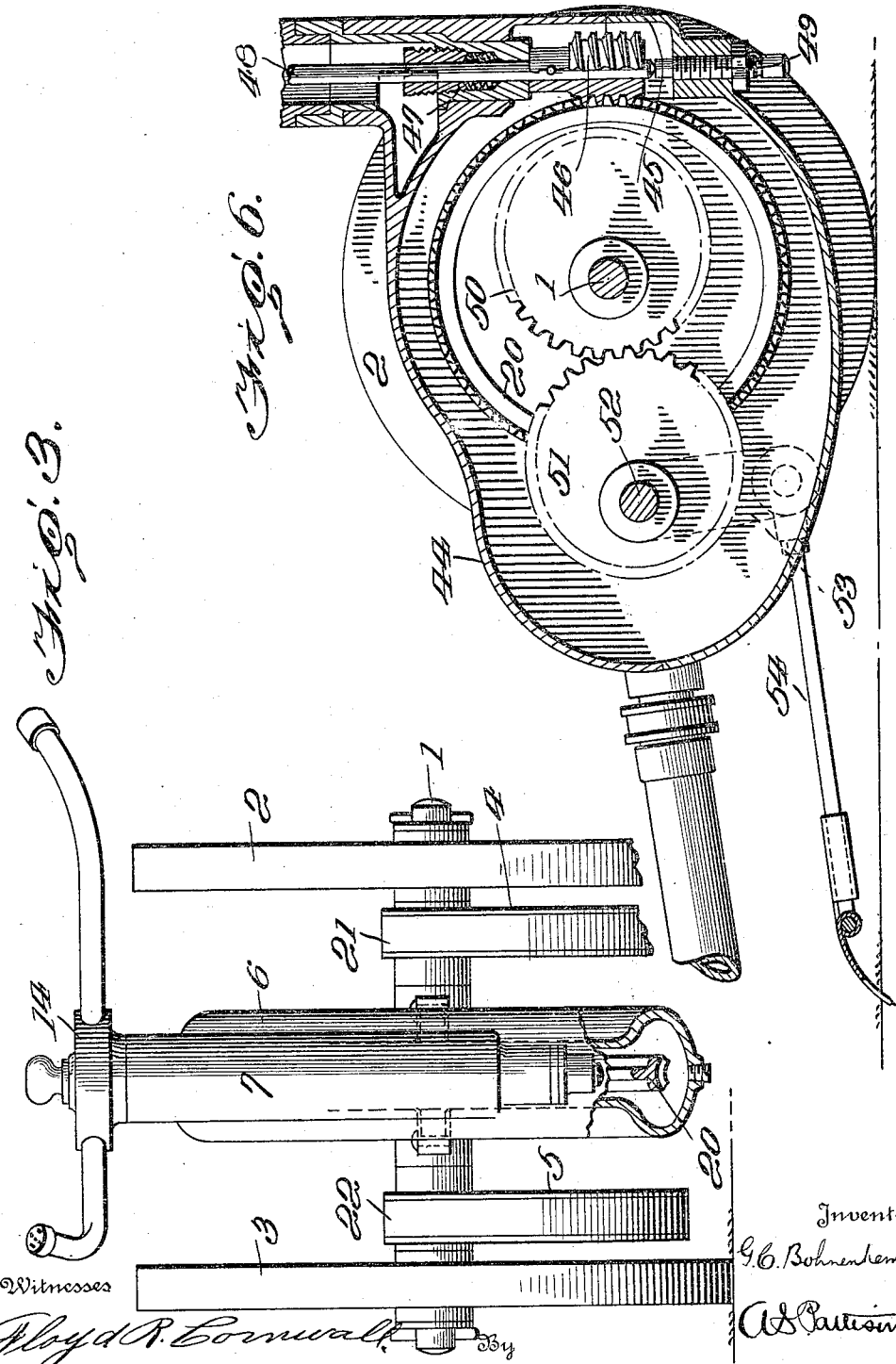

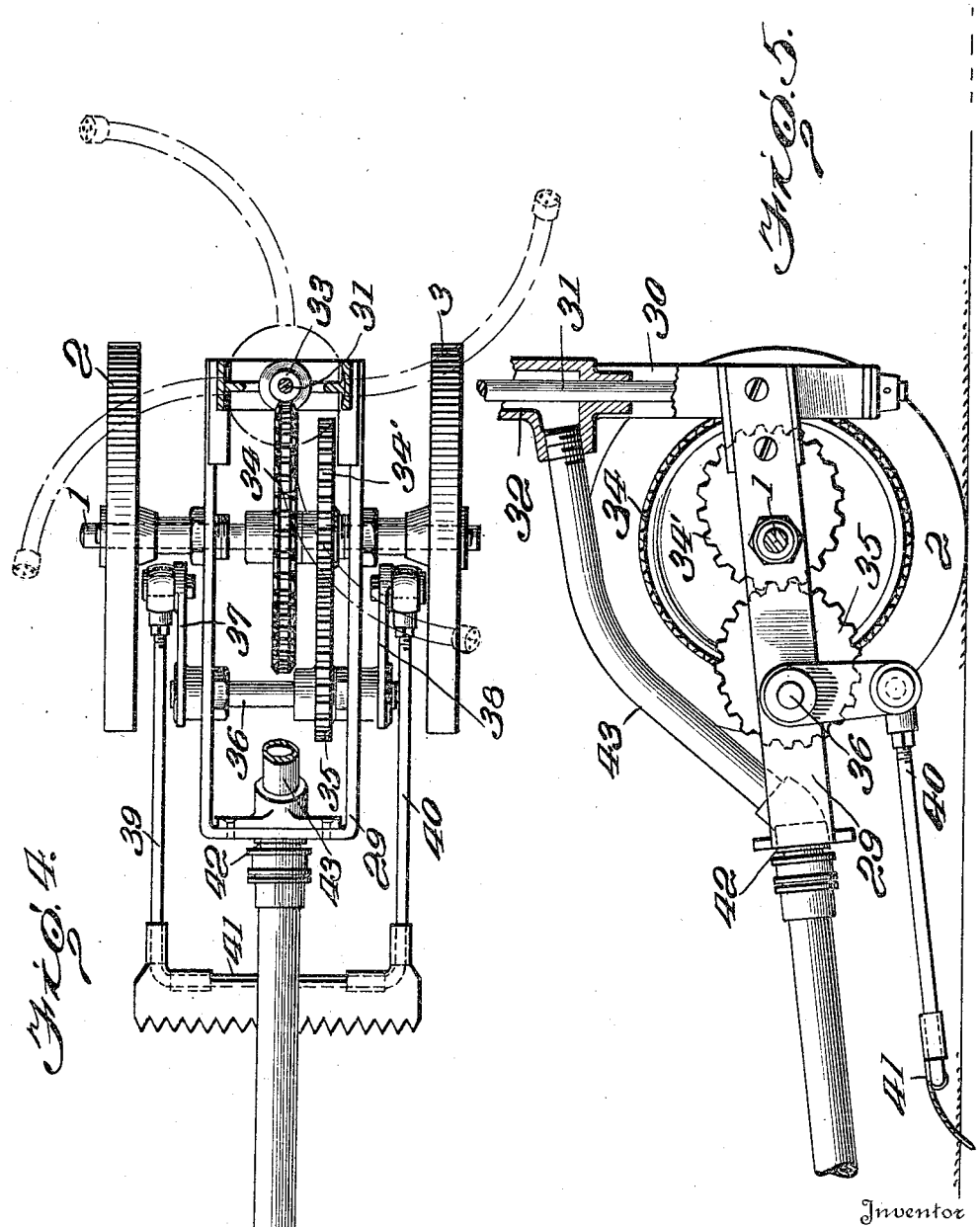

GEORGE C. BOHNENKEMPER, OF DENVER, COLORADO.

LAWN-SPRINKLER.

1,272,609. Specification of Letters Patent. Patented July 16, 1918.

Application filed October 6, 1917. Serial No. 195,045.

*To all whom it may concern:*

Be it known that I, GEORGE C. BOHNENKEMPER, a citizen of the United States, residing at Denver, in the county of Denver and State of Colorado, have invented certain new and useful Improvements in Lawn-Sprinklers, of which the following is a specification, reference being had therein to the accompanying drawing.

My invention relates to improvements in lawn sprinklers.

The object of my invention is to provide a self-propelled lawn sprinkler in which the velocity or reaction of the water passing from the hose to the sprinkler head causes a positive intermittent movement of the sprinkler over the lawn, thereby irrigating the lawn much more evenly and at the same time with a greater saving of water than by the old method.

Another object of my invention is to provide a lawn sprinkler of this character which requires very little attention, thus saving a great amount of labor in the care of a lawn, and one which has a greater radius of movement and at the same time providing a simple, cheap and effective sprinkler having certain details of structure and operation, hereinafter more fully set forth.

In the accompanying drawings—

Figure 1 is a vertical sectional view of my improved self-propelled lawn sprinkler.

Fig. 2 is a top plan view of Fig. 1 showing the water passage and gear housing partly broken away.

Fig. 3 is a front view of Fig. 2.

Fig. 4 is a top plan view of a modified form of lawn sprinkler.

Fig. 5 is a side elevation of Fig. 4, partly in section.

Fig. 6 is a longitudinal section of a still further modified form.

Referring now to the drawings, 1 represents an axle upon which is rotatably mounted the wheels 2 and 3 at each end and which forms the supporting means for the sprinkler. The said axle 1 on the inside of the wheels 2 and 3 has keyed thereon the two eccentrics 4 and 5 which are adapted to be rotated with the axle as hereinafter more fully described. The axle 1 between the eccentrics 4 and 5 has a circular housing 6 loosely mounted thereon and surrounding the same and which forms the gear casing and also the water passage to the rotary sprinkler head.

The forward end of the housing 6 is provided with a vertical housing 7 which is in communication at its lower end with the housing 6 midway its length. The housing 6 at its rear end is provided with a water passage 8 having a nipple 9 communicating therewith and to which is detachably connected the hose 10 through which passes the water for sprinkling and the same water also serving as the motive power for intermittently driving the sprinkler across the lawn or other places to be sprinkled. The water passage 8 extends on both sides of the housing around the upper end as indicated at 11 and 12 and communicates with the central passage 13 at the forward end of the housing. The outer end of the passage 13 communicates with the upper end of the vertical housing 7 below the revolving sprinkler head 14. The sprinkler head is of any of the well-known forms in which the velocity or reaction of the water in its passage therethrough causes it to rotate and thoroughly sprinkle the lawn.

The sprinkler head 14 is mounted upon a vertical shaft 15 which extends downwardly through a combined stuffing box and bearing 16 in the housing 7 and has keyed thereon adjacent its lower end the worm 17. The housing 7 below the worm is provided with a bearing 18 in which the lower end of the shaft is mounted and said shaft extends below the housing and is provided with a nut 19 which prevents any vertical movement of the shaft.

The worm meshes with a large worm gear 20 keyed upon the shaft within the housing. The rotation of the sprinkler head 14 by the reaction or velocity of the water in the head causes the rotation of the shaft 15 and through the worm 17 and the worm gear 20 the axle 1 is rotated to drive the sprinkler as will be presently described.

Mounted on the eccentrics 4 and 5 are the eccentric rings 21 and 22, which have connected thereto the outer ends 23 and 24 of the loop 25. The rear end of the loop 25 has secured thereto a plate 26 the lower edge of which is serrated forming teeth and which are adapted to engage the ground to prevent slipping. The rotation of the axle as previously described, rotates the eccentrics and which in turn causes the loop or kicker to move rearwardly and forcing the sprinkler forward a distance equal to the throw of the eccentrics.

In order to prevent the tension of the hose from drawing the sprinkler rearwardly during the forward movement of the kicker, I provide a loop 27 rigidly secured to the housing 6 and provided with a serrated plate 28 which at all times engages the ground. This loop 27 also serves as a support for the housing to prevent it from rocking on the axle and hold it in the position shown in Fig. 1 of the drawings, as well as a rudder to guide the machine in a straight line.

In the modification shown in Figs. 4, 5 and 6 the axle 1 has the wheels 2 and 3 mounted thereon in the same manner as the preferred form, but instead of the housing and eccentrics, I provide a frame 29 loosely mounted intermediate its ends on the axle 1 and provided with a foot to hold it in the position shown in Fig. 5 of the drawings. The forward end of the frame is provided with a vertical frame 30 in which is mounted a sprinkler head of the same character as that shown in the preferred form. The shaft 31 of the sprinkler head extends downwardly through the water passage 32 and carries a worm 33 meshing with the worm gear 34 keyed upon the axle 1. The axle 1 on one side of the worm gear has keyed thereon a gear 34', which meshes with a gear 35 keyed on the shaft 36. The shaft 36 is rotatably mounted in the frame 29 and carries on its ends on the outside of the frame the crank arms 37 and 38 to which are pivotally connected the free forward ends 39 and 40 of the loop or kicker 41.

The rear end of the frame has a nipple 42 carried thereby and to which the hose 43 is connected. The nipple 42 is in communication with a passage 43 which extends upwardly and forwardly and is in communication with the water passage 32 directly below the head, whereby water is supplied to the head for sprinkling and also as a motive power.

In Fig. 6 I have shown a similar type of machine except I have shown a housing 44 taking the place of the frame of the form shown in Figs. 4 and 5. The housing 44 communicates with the vertical forward housing 45, the same as that shown in Figs. 1 to 3, and the sprinkler head and worm 46 engages the bearing 47 and prevents the upward movement of the shaft 48. The shaft 48 is held upwardly and vertically adjusted through the medium of the screw 49. The worm 46 meshes with a worm gear carried by the axle 1 and said axle having an eccentric gear 50 meshing with an eccentric gear 51 carried by the shaft 52 which carries the crank arm 53 and kicker 54 in precisely the same manner as that shown in Figs. 4 and 5 and needs no further description. The eccentric gears increase the power of the driving means and also gives a quick return of the kicker or a variable speed.

In other types of traveling sprinklers where the supporting wheels are driven to cause the travel of the sprinkler there is not weight or friction enough of the wheels and they will spin and tear up the grass, while in my improved sprinkler the drive is positive and does not depend upon friction or traction of the wheels but upon the firm grip of the kicker upon the ground. The drive being positive it will be seen that the kicker will move the sprinkler forward a certain distance, dragging the hose, and on the forward movement of the kicker the sprinkler is held against rearward movement by the foot, as will be readily understood.

Having thus described my invention what I claim and desire to secure by Letters Patent is—

1. A sprinkler of the character described, comprising an axle, supporting wheels loosely mounted on the axle, a reciprocating propelling member, and a rotating sprinkler operatively connected with the reciprocating propelling member, whereby the rotation of the sprinkler causes a reciprocation of the propelling member and an intermittent movement of the sprinkler.

2. A sprinkler of the character described, comprising a frame, an axle supporting the frame, supporting wheels loosely mounted on the axle, a reciprocating mechanism carried by the frame, a pusher operatively connected with the reciprocating member, a rotating member operatively connected with the reciprocating mechanism, and a rotating sprinkler operatively connected with the rotating member, whereby the rotation of the sprinkler causes an intermittent movement of the frame, for the purpose described.

3. A sprinkler of the character described, comprising an axle, supporting wheels loosely mounted on the axle, a frame loosely mounted on the axle intermediate the wheels, a sprinkler head carried by the frame, a gear keyed to the axle, means operated by the sprinkler head for driving said gear, a kicker and means operated by the axle for operating said kicker and thus forcing the machine forward.

4. A sprinkler of the character described, comprising an axle, supporting wheels loosely mounted on the axle, a frame loosely mounted on the axle, a foot supporting the rear end of the frame, a sprinkler head carried by the frame, a kicker, and means operated by the sprinkler head for operating the kicker.

5. A sprinkler of the character described, comprising an axle, supporting wheels mounted on the axle, a sprinkler head, a foot to prevent backward movement of the wheels, a kicker, and means operated by the sprinkler head for operating the kicker, said kicker widened at its lower end and adapted to firmly engage the ground to prevent slippage.

6. A sprinkler of the character described, comprising an axle, supporting wheels, mounted on the axle, a frame supported by the axle, a foot carried by the frame, to prevent the backward movement thereof and at the same time act as a guide to direct the travel of the machine, a kicker, a sprinkler head and means operated by the sprinkler head for operating said kicker.

7. A sprinkler of the character described, comprising an axle, supporting wheels mounted on the axle, a frame mounted on the axle, a foot carried by the rear end of the frame and supporting the same, a sprinkler head carried by the frame, a hose connection for said head, a kicker adapted to firmly engage the ground, and means operated by the sprinkler head for operating said kicker.

8. A sprinkler of the character described, comprising an axle, supporting wheels mounted on the axle, a frame loosely carried by the axle, a rigid foot carried by the rear end of the frame and supporting the same, a rotary sprinkler head carried by the frame, a hose connection for said head, a worm driven by the rotary sprinkler head, and a kicker operated by said worm whereby the sprinkler is intermittently moved forward dragging the hose with it.

9. A sprinkler of the character described, comprising an axle, supporting wheels mounted on the axle, a frame loosely mounted on the axle intermediate the wheels, a foot rigidly carried by the rear end of the frame, a rotary sprinkler head carried by the frame, a hose connection for said head, a gear driven by said sprinkler head, a kicker and means operated by the gear for operating said kicker.

10. A sprinkler of the character described, comprising an axle, supporting wheels mounted on the axle, a frame loosely mounted on the axle intermediate the wheels, eccentrics keyed on the shaft on the outside of the frame, eccentric bands on said eccentrics, a kicker carried by the bands, a rotary sprinkler head carried by the frame, and means operated by the sprinkler head for rotating the axle for rotating the eccentrics and operating said kicker.

11. A sprinkler of the character described, comprising an axle, supporting wheels loosely mounted on the axle, a frame loosely mounted on the axle intermediate the wheels, a gear keyed to the axle, a rotary sprinkler head carried by the frame, a worm carried by the head and driving said gear, a kicker and means operated by the axle for operating said kicker.

12. A sprinkler of the character described, comprising an axle, wheels loosely mounted on the axle, a frame loosely mounted on the axle between the wheels, a foot carried by the rear end of the frame, a rotary sprinkler head carried by the frame, a hose connection carried by the frame and in communication with the sprinkler head, a worm carried by the sprinkler head, a worm gear keyed to the axle and driven by the worm, eccentrics keyed to the axle on the outside of the frame, eccentric bands on the eccentrics, and a kicker carried by the bands.

13. A sprinkler of the character described, comprising an axle, wheels loosely mounted on the ends of the axle, a frame loosely mounted on the axle between the wheels, a foot rigidly carried by the rear end of the frame and supporting the same, a rotary sprinkler head carried by the frame, a vertical shaft carried by the sprinkler head, a worm carried by the lower end of the shaft, a worm gear keyed on the axle and meshing with the worm, eccentrics keyed on the axle on the outside of the frame, eccentric bands on said eccentrics, a kicker rigidly carried by the bands, and a hose connection carried by the frame and in communication with the sprinkler head.

14. A sprinkler of the character described, comprising an axle, wheels loosely mounted on the ends of the axle, a housing loosely mounted on the axle and surrounding the same, a foot rigidly secured to the rear end of the housing, a vertical housing carried by the forward end of the housing, a rotary sprinkler head carried by the upper end of the vertical housing, a water passage extending around the upper end of the loosely mounted housing and communicating with the sprinkler head, a vertical shaft carried by the sprinkler head, a worm carried by the lower end of the shaft, a worm gear keyed on the axle within the housing and meshing with the worm, eccentrics keyed on the axle on the outside of the housing, eccentric bands on the eccentrics and a kicker rigidly carried by the bands.

15. A sprinkler of the character described, comprising an axle, supporting wheels mounted on the axle, a frame mounted on the axle intermediate the wheels, a kicker carried by the frame, means operated by the axle for operating said kicker, a rotary sprinkler head carried by the frame, and means operated by the rotary sprinkler head for rotating the axle.

16. A sprinkler of the character described, comprising an axle, supporting wheels loosely mounted on the axle intermediate the wheels, a foot carried by the rear end of the frame for supporting the same and preventing the backward movement thereof, a kicker carried by the frame, means operated by the axle for operating the kicker, a rotary sprinkler head carried by the frame, and means operated by the rotary sprinkler head for rotating the axle.

In testimony whereof I hereunto affix my signature in the presence of two witnesses.

GEORGE C. BOHNENKEMPER.

Witnesses:
GUSTAF C. EK,
CLARENCE WHITE.

Copies of this patent may be obtained for five cents each, by addressing the "Commissioner of Patents, Washington, D. C."